TELEPHONE SYSTEM COIN CONTROL ADAPTER AND CONNECTOR

Filed March 11, 1949 6 Sheets-Sheet 1

INVENTOR.
WILLIAM W. PHARIS
BY Winfred T. Powell
ATTORNEY

Oct. 27, 1953 W. W. PHARIS 2,657,267

TELEPHONE SYSTEM COIN CONTROL ADAPTER AND CONNECTOR

Filed March 11, 1949 6 Sheets-Sheet 2

INVENTOR.
WILLIAM W. PHARIS
BY Winfred T. Powell
ATTORNEY

TELEPHONE SYSTEM COIN CONTROL ADAPTER AND CONNECTOR

Filed March 11, 1949 6 Sheets-Sheet 3

INVENTOR.
WILLIAM W. PHARIS

BY Winfred T. Powell
ATTORNEY

TELEPHONE SYSTEM COIN CONTROL ADAPTER AND CONNECTOR

Filed March 11, 1949 6 Sheets-Sheet 4

INVENTOR.
WILLIAM W. PHARIS
BY Winfred T. Powell
ATTORNEY

TELEPHONE SYSTEM COIN CONTROL ADAPTER AND CONNECTOR

Filed March 11, 1949 6 Sheets-Sheet 5

INVENTOR.
WILLIAM W. PHARIS
BY Winfred T. Powell
ATTORNEY

TELEPHONE SYSTEM COIN CONTROL ADAPTER AND CONNECTOR

Filed March 11, 1949 6 Sheets-Sheet 6

INVENTOR.
WILLIAM W. PHARIS
BY Winfred T. Powell
ATTORNEY

Patented Oct. 27, 1953 2,657,267

UNITED STATES PATENT OFFICE 2,657,267

TELEPHONE SYSTEM COIN CONTROL ADAPTER AND CONNECTOR

William W. Pharis, Rochester, N. Y., assignor to Stromberg-Carlson Company, a corporation of New York Application March 11, 1949, Serial No. 80,993

13 Claims. (Cl. 179—6.3)

The present invention relates in general to measured service telephone systems and more particularly to means for controlling the collection and refunding of coins deposited in paystation apparatus.

The main object of the present invention is the provision of new and novel circuit arrangements by means of which the collection and the refunding of deposited coins are automatically controlled and are controlled from an operator's position in the local or in a distant exchange.

Another object of the invention is the provision of a novel two way trunk circuit connecting the local and the distant exchanges over which the operator can collect or refund coins in connection with calls made over this trunk circuit.

A feature of the invention relates to a novel coin control connector switch for use by the operator in controlling coin collect and refund operations.

Other features of the invention not specifically mentioned will be apparent from the following description.

Referring to the drawings, comprising Figs. 1 to 8 inclusive, Fig. 8 shows how Figs. 1 to 6 inclusive are put together in order to make it easy to trace the circuit operations of the various units in the system.

Fig. 7 is a block diagram showing the layout of a system to which the present invention is particularly adaptable.

Figs. 1 to 6 inclusive show the circuit details of various pieces of apparatus in a system in which the present invention may be particularly useful.

The automatic paystation illustrated in the extreme right hand portion of Fig. 6 may be of the well known type of coin collecting mechanism, such as shown in Forsberg Patent 1,043,219 granted November 5, 1912, this coin collecting mechanism being shown connected to a telephone substation of the well known dial type.

In the central office, an adapter circuit, shown in Figs. 6 and 5, is individual to the automatic paystation line, this adapter circuit terminating in a connector multiple, shown in the right hand portion of Fig. 3 and also extending by way of the usual line circuit, line switch or line finder to a selector (the line circuit, line switch, line finder and selector not being shown in detail since it is unnecessary to show such detailed circuits for an understanding of the present invention).

As illustrated in Fig. 7, the selector has access to local connectors (not shown in detail) for establishing local connections, this selector likewise having access to one or more CLR trunk circuits for establishing CLR calls when the CLR operator is in the same CDO as the automatic exchange. This CLR trunk is shown in detail in Fig. 4.

Figure 3:
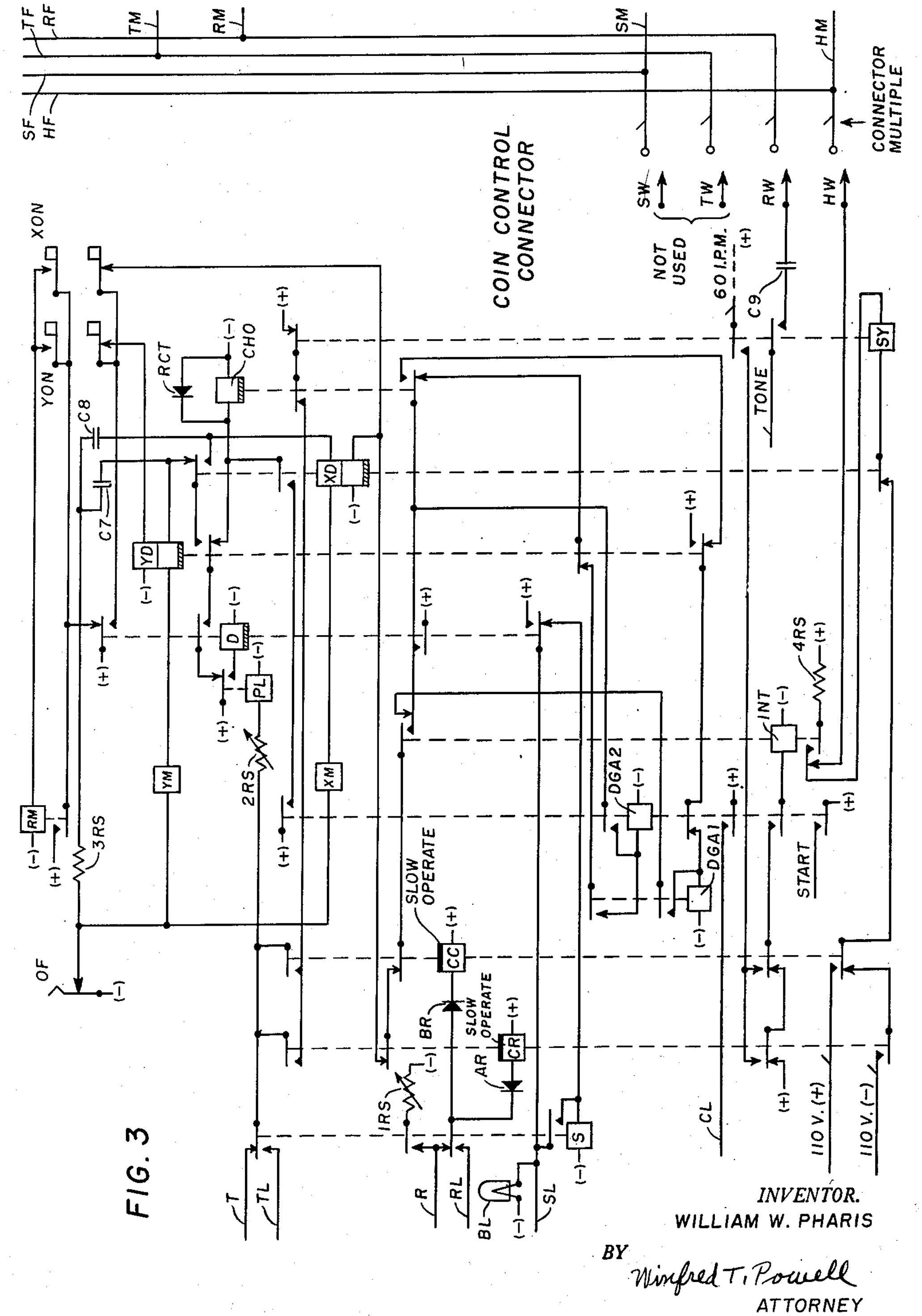

Fig. 3 illustrates the detailed circuits of a coin control connector which is used by the calling operator (either in the local office or in the distant office) for establishing connections to paystation lines for the control of the collecting and refunding of coins, all in a manner which will be later described in detail. The line finder, selector and connector switches may be of the well known XY type, which are two motion step by step switches for selecting levels and contacts in the levels in a well known manner. The connector switch is provided with four wipers, sleeve wiper SW, tip wiper TW, ring wiper RW and extra control wiper HW. The sleeve and tip wipers of the coin control connector are not used, since the usual testing and talking circuits are not provided in this connector.

For the purpose of simplifying the illustrations and facilitating the explanation, various parts and circuits constituting the embodiment of the present invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in a conventional manner and symbols are used to indicate the connections to the terminals of batteries or other sources of current instead of showing all the wiring connections to these terminals. (+) and (—) symbols are employed to indicate the positive and the negative terminals respectively of the usual common battery or source of direct current, instead of using the ground and battery symbols usually found in telephone circuits, it being understood that the positive terminal is connected to ground. The coin control direct current source is indicated 110 v.

(+) and 110 v. (−) to indicate the positive and negative terminals of this high voltage coin return battery or other source of direct current. The contacts of the various relays are located at various distances from the block representing the winding of the associated relay, with these contacts being indicated as being associated with the relay by means of a dashed line.

In order to explain the operation of the circuits, it will be pointed out how various type calls are set up through the various illustrated circuits.

*Local connection*

Figure 6:
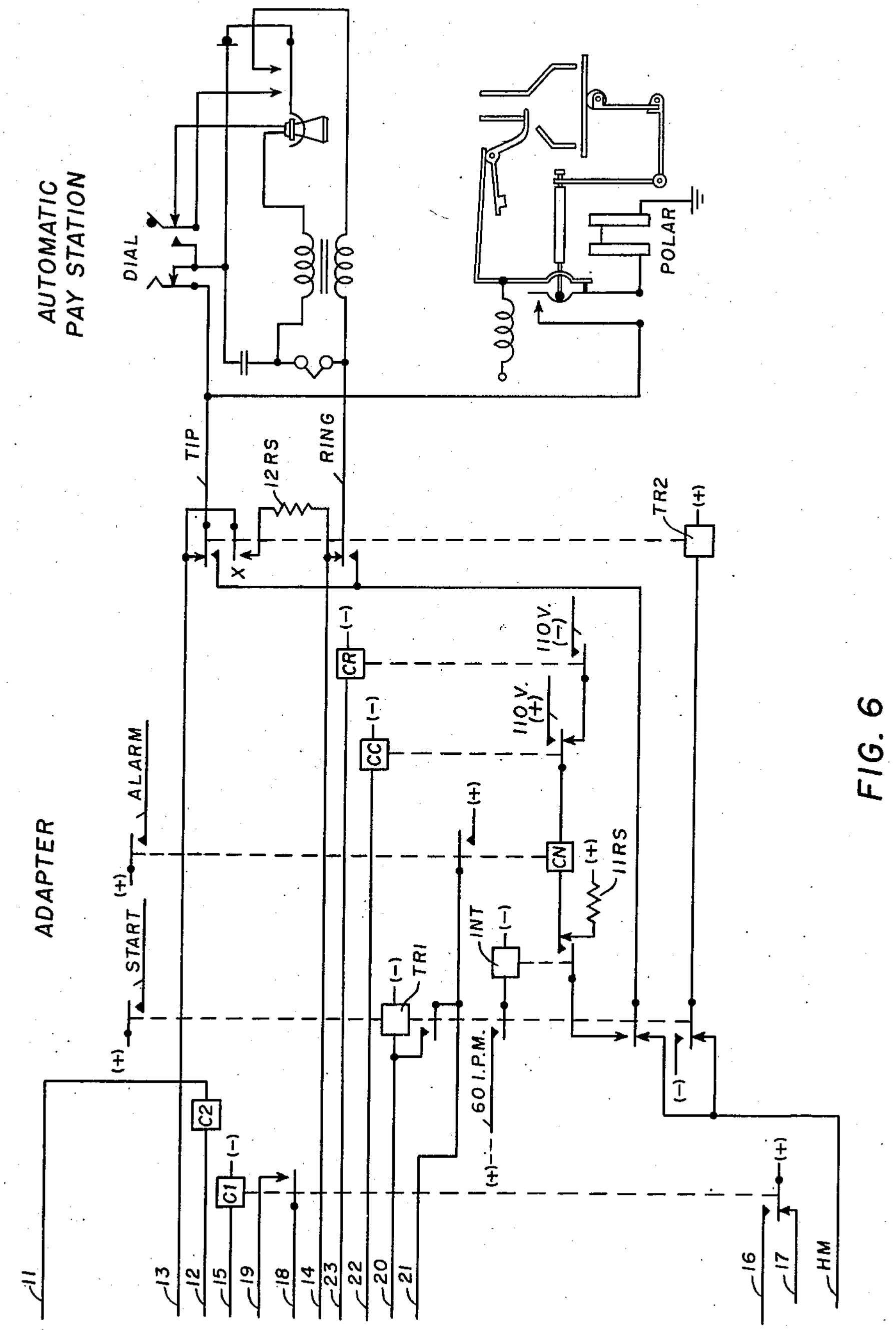

It will first be assumed that a party wishes to extend a call from the automatic paystation, illustrated in the right hand portion of Fig. 6, by way of a local connector in the same office to a called line.

When the calling party removes the receiver at the calling paystation, the closed circuit across the calling line operates relay C1 of the adapter over a circuit extending from (+), break contact of relay R, conductor 11, winding of impedance coil C2, conductor 12, upper winding of relay LO, break contact of relay SW, conductor 13, break contact of relay TR2, tip line conductor, calling substation circuit, ring line conductor, break contact of relay TR2, conductor 14, break contact of relay SW, lower winding of relay LO, conductor 15 and winding of relay C1 to (−). Relay C1 closes a circuit for operating relay D extending from (+), make contact of relay C1, conductor 16 and winding of relay D to (−). Relay C1 closes a circuit for energizing the line relay of the line circuit (not shown) for operating the line finder or line switch to extend the calling line to the selector. This closed circuit may be traced from the tip and ring conductors TF and RF extending to the line circuit, conductors TM and RM, now following conductor TM, resistor 10RS, impedance coil IMP, break contact of relay S and make contact of relay D to conductor RM. This starts the line switch or line finder and links the calling line to the selector in the well known manner. The busy lamp associated with the line circuit is operated by way of the sleeve conductor SF (grounded when the calling line is extended to the selector), conductor SM and busy lamp to (−).

The party at the calling substation now deposits a coin of suitable denomination in the coin mechanism provided for that purpose. This mechanism is well understood and the operation need not be explained in detail. When the coin is deposited, it descends past the trigger mechanism which is released by the coin with the result that the polar magnet of the coin mechanism is connected to the tip line conductor. The coin is held in suspense by a trap where it is adapted to be either collected or refunded under the control of the polar magnet. The coin may be deposited either before or after the receiver is removed but in either case the latter operation brings about the operation of relay LO in the adapter circuit because the ground connection through the polar magnet is extended by way of the make contact of the coin mechanism and over the tip conductor to the left hand terminal of the upper winding of relay LO. This energizes the lower winding of relay LO in series with relay C1 with sufficient current to operate relay LO, since this circuit to ground is extended by way of the substation hook switch and the ring line conductor, break contact of relay SW to the left hand terminal of the lower winding of relay LO for effectively shunting the above described current through coil C2 and the upper winding of relay LO. This operates relay LO, this relay not being operated when the receiver was removed because of equal current flow through both windings of this relay, connected in a differential manner.

The operation of relay LO closes a circuit for operating relay T which may be traced from (+), make contact of relay LO, break contact of relay CHO, make contact of relay D and winding of relay T to (−). The operation of relay T extends the calling line by way of break contacts of relay SW and condensers C11 and C12 to the selected finder-selector link by way of break contacts of relay REV and conductors TM and RM. This permits dial tone to be extended back to the calling line. The operation of relay T closes a circuit for operating relay S extending from (+), make contact of relay T and upper winding of relay S to (−). Relay S closes a locking circuit for itself extending from (+) on sleeve conductor SM (previously traced), make contact and lower winding of relay S to (−). The operation of relay S short circuits, at its two uppermost make contacts, both windings of relay LO for effecting the release of this relay. The operation of relay S also closes a circuit for operating relay SD traced from (+), make contact of relay S and winding of relay SD to (−).

The calling subscriber now dials the wanted number. Each impulse of the wanted number transmitted by way of the calling line is effective to control the release and operation of relay C1 in response to these impulses and relay C1 in turn repeats these impulses to the selector and connector circuits by opening and closing its lower inner make contact in response to the impulse transmission, this make contact being in the above traced circuit leading to the finder-selector link.

The first release of relay C1 closes a circuit for operating relay CHO extending from (+), break contact of relay C1, conductor 17, make contact of relay D and winding of relay CHO to (−). Relay CHO, at its uppermost make contact, short circuits resistor 10RS and impedance coil IMP so that these impedances are removed from the circuit to the switches during impulsing. The operation of relay CHO opens up and releases relay T for removing condensers C11 and C12 from the circuit during the impulse transmission. Between each digit, relay CHO is released because relay C1 remains operated for a comparatively long time interval and relay CHO is again operated over the previously described circuit at the beginning of each digit transmission. This means that relay T will follow the operations of relay CHO so that relay T will be operated when the dial stops at the end of the transmission of the last digit for including condensers C11 and C12 in the talking circuit. The release of relay CHO at the end of the impulse transmission removes the above traced short circuit from resistors RD and IMP, thus inserting these resistors across the trunk circuit for holding purposes and to include a bridged impedance across this trunk to permit voice transmission through condensers C11 and C12. It will be noted that the normal current flow in the trunk circuit by way of conductors TM and RM extends through rectifier CR in the proper direction to short circuit relay SY and prevent its operation during impulsing, as well as during the inter-digit pauses.

Since it is assumed that this is a local call, the connection will be extended to the called line by way of a local connector (not shown) and when the call is answered this connector reverses battery back over the line conductors in the well known manner. This reversal of battery reverses the current flow through conductors RM and TM so that (+) potential is extended by way of conductor RM, winding of relay SY (not short circuited by rectifier CR for current flow in this direction), break contact of relay REV, conductor 18, make contact of relay C1, conductor 19, winding of impedance coil IMP, resistor 10RS (shunted by relay LP and rectifier DR connected in the proper direction to permit current to flow through the winding of relay LP) and conductor TM to (−). This results in the operation of relays SY and LP in response to the answering of the call by the called party. Relay SW is now operated over a circuit extending from (+), make contact of relay S, make contact of relay LP and winding of relay SW to (−). Relay SW locks itself operated over a circuit extending from (+), make contact of relay SD, make contact and winding of relay SW to (−). The operation of relay SW switches the calling line through to conductors TM and RM leading to the switch circuits by way of continuity contacts of relay REV. This switching of the line circuit straight through to the battery feed circuit in the connector removes relay C1 and impedance coil C2 from the calling line circuit for effecting the release of relay C1. This switching through of the circuits and the consequent release of relay C1 removes coils IMP and LP from the circuit, thus effecting the release of relay LP. The release of relay C1 closes the above described circuit for again operating relay CHO which in turn opens up and releases relay T for removing condensers C11 and C12 from the talking circuit. Relay D is released when relay C1 releases and opens up the above described energizing circuit for relay D and the release of relay D opens up and releases relay CHO.

It will be noted that the connection to ground by way of the polar relay of the coin apparatus at the calling station is extended to conductor TM. In order to prevent the lockup of the switch circuits from this coin box ground it is necessary to keep the connection from the battery feed coil in such a direction that there will be no circuit from this coin box ground to battery through the line or control relay of the switch circuits. In order to do this, relay REV is provided to keep the current flow from the switch circuits to the calling line always in the proper direction to prevent lockup. For example, when relay SW operates for effecting the release of relays C1 and D in response to the answering of the call, as previously described, relay REV is operated over a circuit extending from (+), break contact of relay D, make contact of relay S, break contact of relay R, make contact of relay SY and winding of relay REV to (−).

Figure 4:
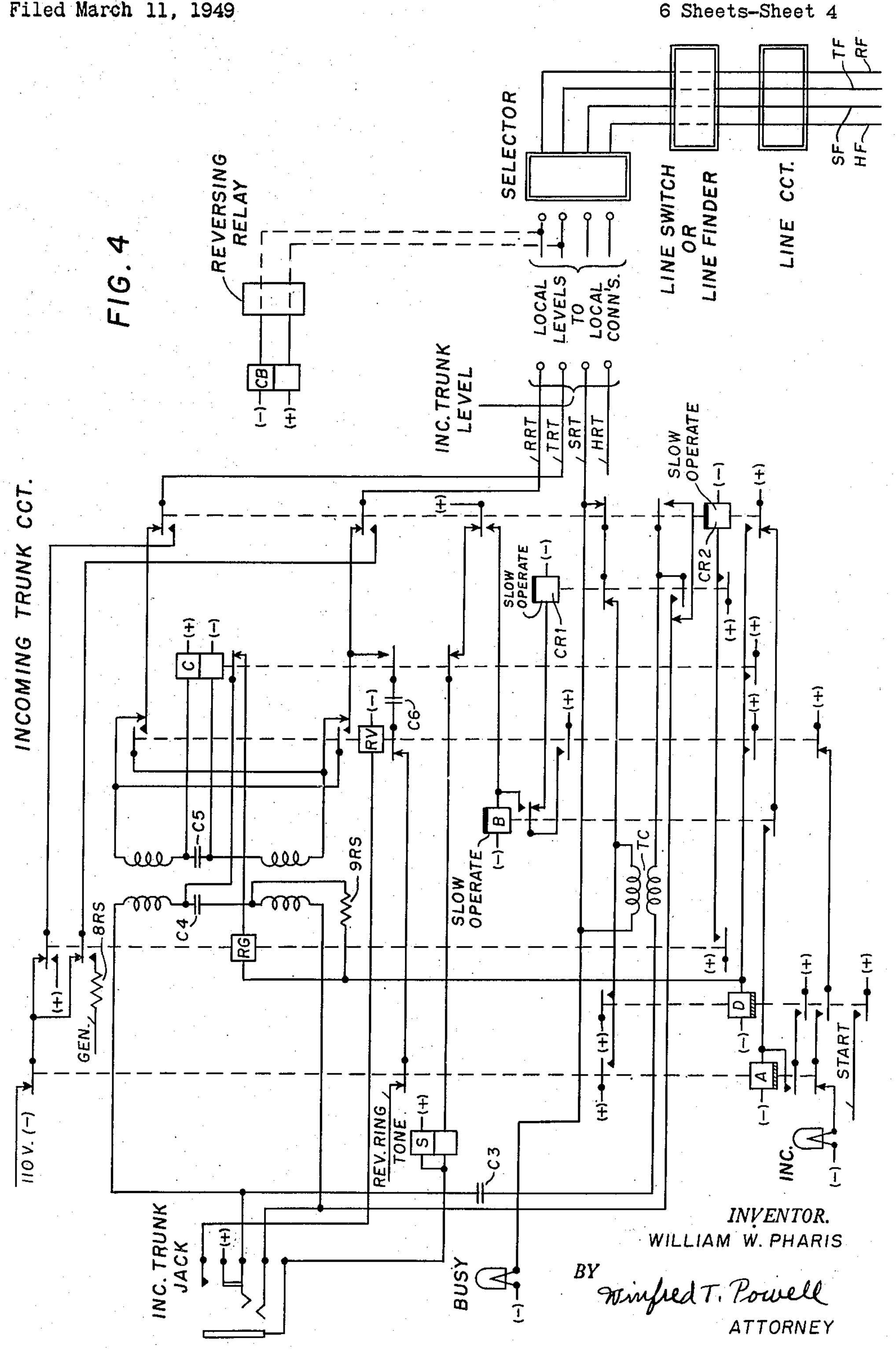

Referring to the dotted line connection to the control relay CB of the connector, shown in the right hand portion of Fig. 4, the circuit back to the calling substation may be traced from (+), lower winding of relay CB, through the contacts of the reversing relay (operated when the called party answers), ring terminal and wiper of the selector and finder switches to conductor RF, conductor RM, winding of relay SY, uppermost make contact of relay REV, uppermost make contact of relay SW, conductor 13, break contact of relay TR2, tip line conductor, make contact of the coin apparatus and winding of the polar relay to ground. Since the (+) terminal of the central office battery is connected to ground, there is no current flow in the above traced circuit to lock up the connection. Without the use of a relay, such as relay REV, for reversing the line conductors, this circuit from ground through the polar relay of the coin apparatus would find a path to (−) through the CB relay of the connector either before or after the call had been answered. With the provision of relay REV, when the called party hangs up and the battery connection through the windings of relay CB is straightened out, current flow is in such a direction that relay SY will release. This opens up and releases relay REV so that the connection from ground through the coin apparatus polar relay is again extended to the positive terminal of the central office battery through the winding of relay CB, because the tip side of the calling line is now connected to conductor TM which extends to the (+) side of the CB relay, thus preventing lock up under this condition.

When the calling party hangs up the receiver and opens up the line circuit, relay CB of the connector is released because the calling line is connected straight through the adapter to the windings of the CB relay. The release of relay CB of the connector switch restores the switching circuits to normal and removes (+) potential from sleeve conductors SF and SM in the well known manner. This extinguishes the busy lamp associated with the adapter and effects the release of relay S which in turn opens up and releases relay SD.

Relay TR1 is operated by the release of relay S, before relay SD (slow acting) is released, over a circuit extending from (+), break contact of relay S, make contact of relay SD and winding of relay TR1 to (−). Relay TR1 closes a first locking circuit for itself extending from (+), make contact of relay SD, conductor 21, make contact and winding of relay TR1 to (−). Relay TR1 closes an obvious circuit for operating relay TR2. Since it was assumed that this call was answered, it is now in order to apply coin collect battery to the calling line for collecting the suspended coin. This is accomplished by operating relay CC in multiple with the operating circuit for relay TR1, the CC operating circuit extending through a make contact of relay SW (locked operated as long as relay SD remains operated), conductor 22 and winding of relay CC to (−). Relay CC applies 110 volt (+) to the calling line over a circuit extending from this source of current, make contact of relay CC, winding of relay CN, make contact of relay INT (intermittently operated as long as relay TR1 is operated), make contact of relay TR1, make contacts of relay TR2, tip and ring line conductors, make contact of the coin apparatus and winding of the polar relay to ground. This (+) potential causes current to flow through the polar relay at the substation in the proper direction for collecting the coin. During the time that relay INT is released between pulses from the 60 IPM interrupter, the 110 volt circuit is maintained complete through the winding of relay CN by way of resistor 11RS to (+) for maintaining this CN relay operated for locking the TR1 and SW relays over a second locking circuit. During the interval when the 60 IPM interrupter circuit is de-energized and relay INT is released, the coin battery is disconnected from the line for restoring the coin apparatus to normal. In the event that the coin apparatus fails to dispose of the coin, the coin battery will be applied to the line each time relay INT is operated and the circuit will be held in this condition because relay CN will be operated either locally or over the line circuit. In the event of such a failure to dispose of the coin, the continued operation of relay CN closes the alarm circuit for bringing in an alarm signal.

In the event that the call is not answered, relay SW will be in its normal position when the calling party hangs up and when the connection is released, the release of relay S closes the above described circuit for operating relay TR1, but this time the multiple circuit is extended through a break contact of relay SW and conductor 23 for operating relay CR. Relay CR applies 110 volts (—) to the line during the operations of relay INT for causing the coin apparatus at the substation to refund the coin. The clearing out of the circuit and the alarm control in connection with the coin refund operation is similar to that above explained, because relay CN is included in the 110 volt (—) circuit. It will be understood that relays SY, LP, SW and REV do not operate on a connection that is not answered. When relay CN releases in response to the disposal of the coin, relays CC, TR1, TR2 and SW are released, thus restoring the circuits to normal.

The X contact (which makes before any other contact switches) on relay TR2 closes a path through resistor 12RS to the line circuit. Since relays SW, TR1 and TR2 are locked operated as long as relay CN is operated, and since relay CN remains operated until the coin is disposed of, this closed path through resistor 12RS will hold the line circuit (not shown) on lockout to prevent the extension of this line to a selector link during the time that the coin is being disposed of. If it were not for this closed circuit through resistor 12RS any delayed operation during the collecting or refunding of the coin at the calling station might intermittently energize the line circuit for unnecessarily causing a selector to be associated with this line when not needed.

*CLR trunk call*

On a CLR trunk call, the call is originated at the calling paystation for associating an idle selector with the calling line in the previously described manner. In this example, the calling subscriber dials a digit for causing the selector to advance to a level to which CLR trunks are connected, one such trunk being illustrated in Fig. 4 and assumed to be in the community dial office.

When the selector cuts through to the selected incoming trunk circuit, relay C (Fig. 4) is energized over a circuit extending from (+), upper winding of relay C, upper right hand winding of the repeat coil, break contact of relay RV, break contact of relay CR2, tip of incoming trunk conductor TRT and bank contact of the selector connected to this conductor, back over the tip side of the calling line and through the selector wiper and terminal connected to conductor RRT, break contact of relay CR2, break contact of relay RV, lower right hand winding of the repeat coil and lower winding of relay C to (—). Relay C closes a circuit for operating relay D extending from (+), make contact of relay C and winding of relay D to (—). The operation of relay D applies (+) to the sleeve conductor associated with this trunk for making it busy and for holding the connection, this circuit being traced from (+), make contact of relay D, break contact of relay CR1 and break contact of relay CR2 to conductor SRT. The busy lamp connected to this sleeve conductor is lighted to indicate the busy condition of the trunk. The incoming lamp associated with this trunk circuit is also lighted at this time over a circuit extending from (+), break contact of relay RV, make contact of relay D, break contact of relay A and lamp INC to (—). The calling party now receives revertive ringing tone as an indication that the trunk has been selected, this tone circuit extending from the source of tone, break contact of relay A, break contact of relay RV, condenser C6, make contact of relay C and break contact of relay CR2 to conductor RRT, which is one conductor of the line circuit.

When the operator answers by plugging into the incoming trunk jack, relay RV is operated over a circuit extending from (+), make contact of the trunk jack and winding of relay RV to (—). The operation of relay RV opens up the above described revertive ringing tone circuit to remove this tone from the calling line. The operation of relay RV also opens up the above described circuit to lamp INC for extinguishing this lamp and provides an additional circuit for holding relay D. Relay CR1 is now operated over a circuit extending from (+), make contact of relay RV, break contact of relay B and winding of relay CR1 to (—). Relay CR1 closes a circuit from (+), make contact of relay CR1 and winding of relay CR2 for operating this latter relay. The operation of relay CR2 closes a circuit from (+), make contact of relay CR2 and winding of relay B to (—). Relay B closes a locking circuit for itself extending from (+), make contact of relay RV, make contact and winding of relay B to (—). The operation of relay B also opens up and releases relay CR1, which in turn opens up and releases relay CR2. The CR1, CR2 and B relays are slow to operate in order that they may be delayed slightly in their operation to provide the required timing. Relay RV reverses the current back to the calling line for operating relays SY, LP, SW and REV for the same purpose previously described in connection with the answering of a local call.

The operator receives coin box tone during the time that relays CR1 and CR2 are operated as an indication that this is a call from a paystation line. This circuit may be traced from the left hand terminal of the lower winding of tone coil TC and condenser C3 to the tip side of the trunk circuit and from the right hand terminal of coil TC, make contact of relays CR1 and CR2 to the ring side of the trunk circuit. It will be understood that the tone is repeated over the sleeve conductor of the calling line and applied through the upper winding of tone coil TC so that this tone is induced into the lower winding of this coil for application to the trunk circuit. When both relays CR1 and CR2 are released, the tone is removed from the circuit. It will be obvious that the operator can cause this tone to be repeated into the trunk circuit by removing the plug from the incoming trunk jack and re-plugging, since this operation releases relay RV and starts the cycle of operation of relays CR1, CR2 and B again.

On a call of this type, the coin at the paystation is automatically returned when the operator answers. This is accomplished by the application of 110 volts (—) to the line over a circuit which may be traced from this source of current, break contact of relay A, break contacts of relay RG and make contacts of relay CR2 to the calling line circuit, it being previously explained that 110 volt (−) potential applied to the line operates the coin device at the calling station for refunding the coin. The operation of relay CR2 in response to the answering of the call opens up the above described circuit to relay C for effecting the release of this relay. When relay CR2 is released, relay C is again energized over the line circuit and relay A is energized over a circuit extending from (+), break contact of relay CR2, make contact of relay B and winding of relay A to (−). Relay A closes a locking circuit for itself extending from (+), make contact of relay D, make contact and winding of relay A to (−). It will be noted that (+) potential is applied directly to sleeve conductor SRT, to which the right hand terminal of the upper winding of coil TC is connected as long as relay A or relay D is operated and that the sleeve conductor is disconnected from this circuit to (+) as long as either relay CR1 or CR2 is operated. This provides a circuit for energizing the upper winding of coil TC in series with the sleeve conductor for picking up the coin box tone during the operation of relays CR1 and CR2. After these relays are released, direct (+) is applied to the sleeve conductor for short circuiting the upper winding of coil TC, thus removing this coil from the sleeve circuit when not needed.

When the conversation is completed and the calling party hangs up the receiver, relay C is released for providing "on-hook" supervision to the operator because relay C closes a circuit through its break contact for energizing the tip conductor leading to the incoming trunk jack by way of relay RG and make contact of relay RV to (+). When the operator takes down the connection by removing the plug from the incoming trunk jack, relay RV is released for in turn effecting the release of relays B and D, relay B opening up and releasing relay A for restoring the circuits to normal.

It will be noted that the operator holds the connection from the calling line as long as the plug is in the jack because relays RV and D are maintained operated, the latter relay applying (+) potential to the incoming sleeve conductor. This makes it possible for the operator to ring back on the calling line after the calling party has hung up by applying (−) potential on the tip side of the cord circuit (not shown) which will energize relay RG over a circuit which may be traced from (−) on the tip side of the cord and trunk circuit, upper left hand winding of the repeat coil, break contact of relay C, winding of relay RG and make contact of relay RV to (+). Relay RG operates and closes an obvious circuit for operating relay CR2, thus applying ringing current back over the incoming line conductors over a circuit extending from the generator common GEN, resistor 8RS, make contact of relay RG, make contact of relay CR2, over the calling line, make contact of relay CR2 and make contact of relay RG to (+). It will be noted that relays S, SD and SW of the adapter are operated at this time, thus providing a clear circuit back to the calling station.

It has been explained how the initially deposited coin is automatically refunded on a CLR trunk call when the operator answers. If no charge is required on this type of call, when the calling party hangs up, the pay-station line adapter goes through the previously described operations for collecting the coin, which operations are ineffective at the coin box apparatus at this time because the coin has already been refunded. If this call is completed to a distant point and additional coins are required (after the initial refund), these coins are collected by circuit operations in the paystation adapter when the calling party hangs up the receiver, as previously described. This collecting operation is effected because relay SW of the adapter was operated in response to the answering of the call.

It might be well to point out at this time that, on an outgoing call from the CDO to the distant manual office, the selector (see Fig. 7) is advanced by dial impulses to select a level and a trunk in the level connected to a repeater in the originating office. The repeater signals the associated incoming trunk in the disant manual office and when the operator answers, a relay in the repeater operates to effect the operation of relays SY, LP, SW and REV in the adapter and also to apply refund battery from the repeater for refunding the initial deposit, all in the manner already explained in connection with Fig. 4. From this point on, any additional coins deposited in connection with this call will be collected when the calling party hangs up, since the collect potential is applied to the line at the time of release on a call which has been answered, or the coin collect or refund operations will be controlled by way of the coin control connector of Fig. 3 in a manner now to be described.

*Operation of coin control connector*

It will now be assumed that the calling line is connected to the toll incoming trunk, that the calling party has deposited one or more coins in the coin apparatus (after the initial refund) and that the operator desires to either collect or refund these coins while the connection is still established. In other words, this operation is a manual control of the coin collect or refund mechanism instead of the automatic control of such operations from the calling station. In this connection, it will first be assumed that the toll operator is in the distant office and the manual circuit involved is that shown in Fig. 1.

When the distant office operator plugs into the trunk jack connected to the coin control connector by way of a special trunk line, the local contact of this jack closes an obvious circuit for lighting the busy lamp and a circuit for operating relay BL extending from (+), local make contact of the jack, break contact of relay SY and winding of relay BL to (−). Relay BL closes a circuit for locking itself operated until the plug is removed from the jack, this circuit extending from (+) at the jack contact, make contact and winding of relay BL to (−). Relay BL closes a circuit for operating relay PL extending from (+), make contact of relay BL, break contact of relay S and winding of relay PL to (−). A circuit is now closed for operating relay SY in the manual office and relay PL in the CDO, this circuit extending from (+), winding of relay SY, make contact of relay PL, tip trunk conductor T, break contact of relay S, compensating resistance 2RS and winding of relay PL to (−).

The operation of relay PL (Fig. 3) closes a circuit for operating relay D extending from (+), make contact of relay PL and winding of relay D to (−). Relay D closes a circuit for operating relay XD extending from (+), make contact of relay D, break contact of the X off normal spring XON and lower winding of relay XD to (−). Relay YD is also operated at this time over a circuit extending from (+), make contact of relay D, break contact of the Y off normal spring YON and upper winding of relay YD to (—). A circuit is now closed for lighting the busy lamp at the manual board in the community dial office (if there is a manual board at this point) as an indication that the coin control connector is in use. This circuit may be traced from (+), make contact of relay D, conductor SL, break contact of relay S of the local outgoing trunk circuit (Fig. 2), break contact of relay T and winding of relay TR to (—). Relay TR operates and closes an obvious circuit for lighting the busy lamp associated with the outgoing trunk jack. Lamp BL associated with the coin control connector is connected to conductor SL so that a visual indication will be given the attendant as long as the connector is in use.

Relays DGA1 and DGA2 are for providing digit cancelling when desired. It will be assumed that no digit cancelling is used but that these relays are there for providing this feature later. Relay DGA1 is now operated over a circuit extending from (+), make contact of relay YD, break contact of relay DGA2 and winding of relay DGA1 to (—). Relay DGA1 locks to (+) at a make contact of relay D by way of a break contact of relay INT.

The operator in the manual office now dials two digits for selecting the desired paystation line in the CDO, it being assumed that there is a coin control connector for each 100 line group, thus requiring the dialing of only two digits when the group is selected by plugging into the proper manual outgoing trunk jack. When the dial is turned off normal, a circuit is closed for operating relay S of the trunk circuit extending from (+), off normal contact of the dial, sleeve of the plug and jack, break contact of relay CN, break contact of relay S1 and winding of relay S to (—). The operation of relay S short circuits the winding of relay SY for effecting the release of this relay, this short circuiting path being effective to apply direct (+) to the tip trunk conductor for energizing this conductor at a comparatively high level, this for improving the impulse circuit. The operation of relay S transfers the winding of relay PL from (+) at a make contact of relay BL to a circuit extending through the make contact of relay S, ring of the jack and plug, break contact of relay B, dial impulse contact, break contact of relay B, tip of the plug and jack and make contact of relay S to (+). This includes the winding of relay PL of the trunk circuit in the manual office in series with the dial impulse springs so that the impulses are effective to cause the intermittent operation of relay PL. Each time relay PL of the outgoing trunk circuit is released, the above described circuit including the tip trunk conductor is opened for effecting the release of relay PL at the connector, thus relay PL in the connector circuit follows the impulses transmitted by the dial in the cord circuit. Resistor 6RS and condenser C1 are bridged across the make contacts of relay PL in the trunk circuit for spark suppression purposes. When the dial returns to normal, the dial off normal contact opens up and releases relay S for removing the short circuit from relay SY for operating this relay by including it in series with the tip trunk conductor and relay PL of the test connector.

Figure 1:
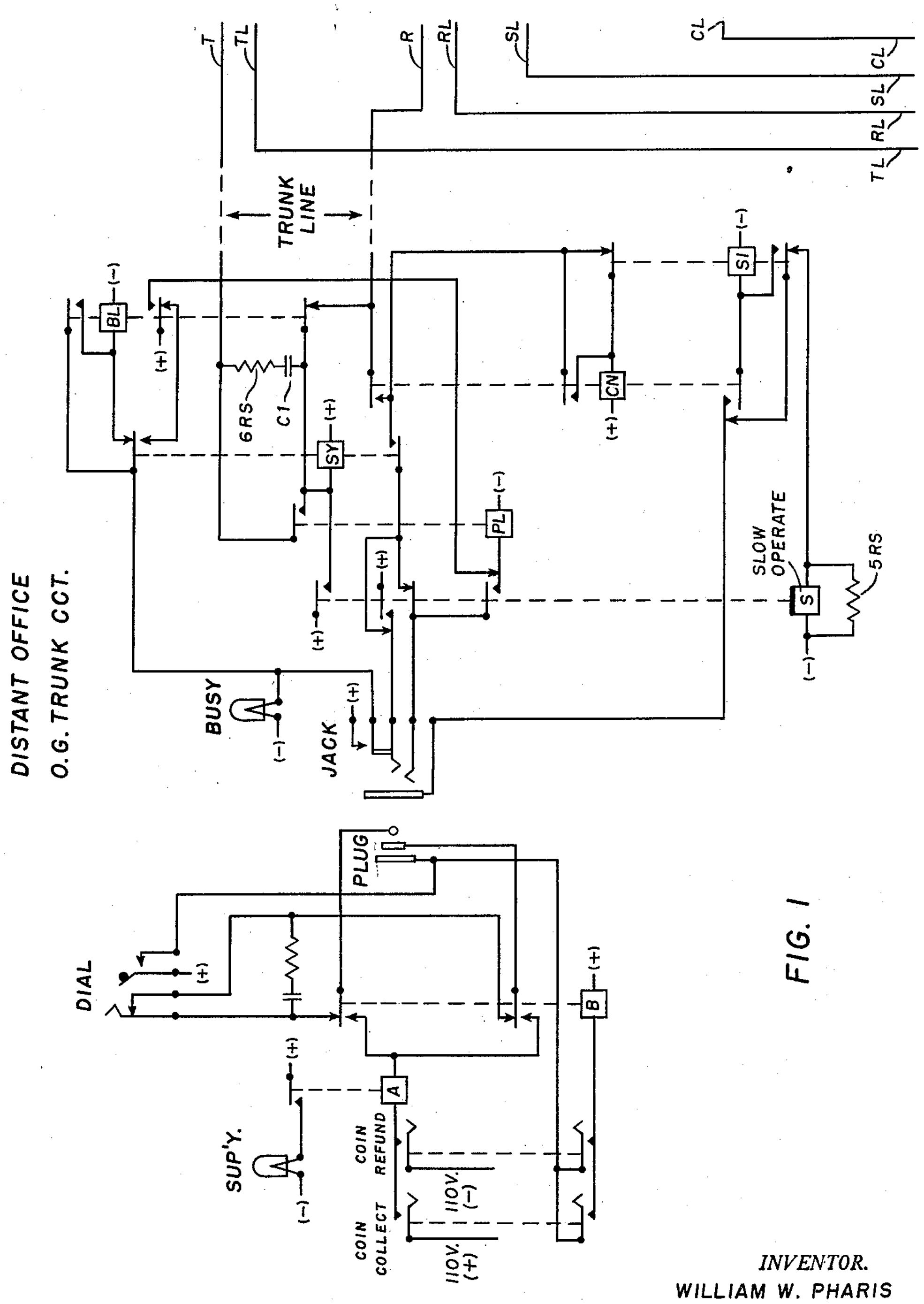
Fig. 1 illustrates an outgoing trunk circuit provided in the distant office, when the manual toll board is not located in the same office as the automatic equipment. This figure also shows a portion of a cord circuit and dial associated with this toll board.

Referring to Figs. 1 and 3, it will be seen that, although the line circuits, including the paystation lines, are multipled to bank terminals of all connectors in the 100 line group, including the coin collect connector, there is no talking circuit established by way of this coin control connector to a called line, since the purpose of this connector is only to control the disposal of coins at the paystation. Furthermore, the pulsing is into the coin control connector over the tip conductor of the trunk, the ring conductor being used only for coin control purposes. This means that, in a composite trunking system, one dial leg may be used for pulsing into the coin control connector and another dial leg may be used for coin control purposes, instead of using a pair of separate conductors as illustrated in Figs. 1 and 3.

When relay PL of the coin control connector is impulsed in response to the impulses of the first digit, relay D remains operated because of its slow acting characteristics and the switch is advanced in its primary direction over a circuit extending from (+), break contact of relay PL, make contact of relay D, make contact of relay YD, make contact of relay XD, upper winding of relay XD, winding of primary or X stepping magnet XM and break contact of overflow springs OF to (—). During this impulsing, relay XD is maintained operated because its upper winding is in the stepping magnet circuit and because this relay is slow acting. When the dial stops to mark the end of the first digit, relay PL remains energized, relay XD releases and the switch wipers are left at the level to which they were advanced.

When the second digit is dialed, the off normal contacts of the dial close the previously described circuit for operating relay S and for releasing relay SY in the outgoing trunk circuit. The tip trunk conductor T is impulsed by relay PL (Fig. 1) in the previously described manner. When the dial stops, relay S is released and relay SY is again operated as previously described. Relay PL in the connector repeats the impulses transmitted by relay PL of the outgoing trunk circuit and at each release of relay PL in the connector, a circuit is closed for driving the switch in its secondary direction, this circuit being traced from (+), break contact of relay PL, make contact of relay D, make contact of relay YD, break contact of relay XD, lower winding of relay YD, winding of magnet YM and break contact of overflow springs OF to (—). This circuit maintains relay YD operated until the end of the second series of impulses transmitted into the connector, the termination of this series of impulses resulting in the release of relay YD and the stopping of the switch on the terminal in the selected level. Condensers C7 and C8 and resistor 3RS are for spark absorbing purposes.

The release of relay YD closes a circuit for operating relay DGA2 extending from (+), make contact of relay D, break contact of relay CHO, break contact of relay YD, make contact of relay DGA1 and winding of relay DGA2 to (—). Relay DGA2 closes a locking circuit for itself extending from (+), make contact of relay D, make contact and winding of relay DGA2 to (—). A local circuit is now closed for operating relay INT extending from (+), break contact of relay CR, break contact of relay CC, make contact of relay DGA2 and winding of relay INT to (—). The operation of relay INT opens up the above described locking circuit for relay DGA1 for effecting the release of this relay. Relay XD is now again operated over a circuit extending from (+), make contact of relay D, make contact of relay INT, break contact of relay CC, break contact of relay CR and lower winding of relay XD to (—). Relay CHO is now operated over a circuit extending from (+), make contact of relay DGA2, make contact of relay XD and winding of relay CHO to (—). Relay CHO is bridged by rectifier RCT to make the relay fast to operate and slow to release.

Since the called line has now been selected, the operator may cause the coin collect or coin refund operation at the called paystation. It will first be assumed that the operator desires to collect the coin or coins at the paystation, consequently the coin collect key in the cord circuit will be operated. The operation of either the coin collect or coin refund key closes a circuit for operating relay B in the cord circuit extending from (+), winding of relay B, make contact of the operated key, sleeve of the plug and jack, break contact of relay CN of the trunk circuit, break contact of relay S1 and winding of relay S to (—). The operation of relay B connects the tip and ring connectors together and extends them through the winding of relay A and the make contact of the coin collect key to 110 volts (+). Current flows over this circuit, through the tip and ring conductors of the plug and jack, break contacts of relay S, make contact of relay SY, break contact of relay S1 and winding of relay CN to (+). Relay CN operates and closes a locking circuit for itself including its inner upper make contact. The operation of relay CN switches the sleeve conductor of the jack from the winding of relay S (before relay S has time to operate because of its slow acting characteristics) to the winding of relay S1 for operating this relay. Relay A operates over the above described circuit including the 110 volts (+) for lighting the supervisory lamp.

The operation of relay CN connects the ring of the trunk conductor to the tip and ring conductors of the plug and jack, to which coin collect battery is connected, for operating coin collect relay CC in the connector over a circuit extending from the ring conductor, break contact of relay S of Fig. 3, rectifier BR and winding of relay CC to (+). Relay CR is connected to the ring trunk conductor but does not operate from coin collect battery because of the polarity of rectifier AR.

The operation of relay CC switches the winding of relay INT from (+) to the common interrupter circuit by way of a make contact of relay SY, this latter relay being operated over a circuit extending from 110 volts (+) in the coin control connector, make contact of relay CC, break contact of relay XD, winding of relay SY, make contact of relay INT and resistor 4RS to (+). The release of relay INT switches from the circuit to (+) through resistor 4RS to wiper HW of the connector so that relay SY is maintained energized over a circuit now extending through wiper HW, conductor HM, break contacts of relay TR1 in the adapter and winding of relay TR2 to (+). Relay TR2 operates for switching the tip and ring conductors of the line to the HM conductor, thus extending the 110 volts (+) from the connector on to the called line. To hold the connection or to prevent giving disconnect supervision, a closed path to the line circuit is provided at the X contact of relay TR2. The operation of relay CC in the coin control connector opens up the above described circuit for the lower winding of relay XD for effecting the release of this relay. Relay XD opens up and releases relay CHO. Relay INT, now being connected to the common interrupter, (+) impulses on this common interrupter circuit are effective to intermittently operate this relay. Relay INT thus intermittently applies 110 volts (+) to the line by way of wiper HW of the connector switch. During the intervals when relay INT is operated, wiper HW is opened so that intermittent coin collect energy is applied to the HW wiper circuit and during these intervals the circuit through relay SY is maintained energized by way of a make contact of relay INT and resistor 4RS to keep relay SY operated during this intermittent application of coin battery to the called line. Consequently, when relay INT releases to apply the coin collect battery to the called line, relay SY will be maintained operated as long as the coin has not been disposed of. When this coin collect battery is applied to the called line after the coin has been disposed of, then there is no circuit for holding relay SY operated, it will release and apply (+) potential to the tip trunk conductor over a circuit which may be traced from (+), break contact of relay SY, break contact of relay CHO, make contact of relay CC and break contact of relay S to the tip trunk conductor. This (+) potential holds relay PL operated to prevent release of the connector switch and it also short circuits relay SY in the outgoing trunk circuit for releasing this relay. The release of relay SY opens up and releases relay CN in the trunk circuit as well as relay A in the cord circuit, the latter relay de-energizing the supervisory lamp as an indication to the operator that the coin has now been disposed of. Until the coin is disposed of, relay A will be maintained energized and the supervisory lamp lighted as an indication that the coin has not yet been taken. Relay S1 is maintained operated when relay CN is released by a locking circuit extending from the sleeve jack, break contact of relay CN, make contact and winding of relay S1 to (—). Relay CC in the connector is released when the R trunk conductor is deenergized by the release of relay SY in the outgoing trunk circuit. The release of relay CC removes (+) potential from conductor T for again inserting the winding of relay SY in the outgoing trunk circuit in series with this trunk conductor for holding relay PL in the connector and for again operating relay SY of the trunk circuit. When the operator sees that the coin has been taken, the coin collect key is restored for releasing relays A and B. The restoration of the coin collect key to normal opens up and releases relay S1.

When the operator takes down the connection the local contact of the trunk jack is opened for extinguishing the busy lamp, for releasing relays BL and PL, the tip and ring conductors of the trunk circuit being opened by the removal of the plug. The release of relay PL opens up the tip trunk conductor for releasing relay SY of the outgoing trunk. The opening of the tip trunk conductor opens up and releases relay PL in the connector circuit, this latter relay effecting the release of relays D and XD, this latter relay having been operated by the operation of relay INT during the intermittent operation of this latter relay for controlling the coin battery. The DGA2 relay is released because its locking circuit is opened by the release of relay D and the INT relay is released by the release of relay DGA2, this INT relay having been operated when the CC relay was released. The release of relay PL in the connector closes the above described circuit for operating relay CHO and when relay D releases this circuit is opened and relay CHO releases, this momentary operation of relay CHO being of no consequence at this time. Since relay SY of the coin control connector is maintained operated as long as coin battery is applied to the line and a coin is still in the paystation, a tone is connected from the common tone source, make contact of relay SY, condenser C9, wiper RW, connector bank terminal and by way of conductor RF or RM to the connection established to or from this line circuit (assumed to be extended to the operator's position at which the coin control operations are provided), thus providing a tone to the operator's listening circuit as an indication that coin battery is being applied to the line. Now when relay SY releases as an indication that the coin has been disposed of, this tone is removed, thus giving the operator an audible signal that the coin has been taken. To review briefly, it is seen that the coin control cord circuit of Fig. 1 may be utilized to control the disposition of coins at a paystation such as is shown in Fig. 6, for example. That is, the coin control switch of Fig. 3 is operated to seize the adapter of Figs. 5 and 6 in the manner illustrated in Fig. 7. Following this, the operator throws either the coin collect or coin refund key (Fig. 1) to transmit a coin control potential. Relay A operates to light a supervisory lamp. Relay SY in the coin control connector (Fig. 3) operates to extend a coin tone through condenser C9, conductors RW and RF, the line circuit, line finder and selector (Fig. 4) to the incoming trunk jack. Thus, it will be seen that the toll operator gets both visual and audible indications of the operation at the coin box. The audible indication tells the operator that the right line has been selected by the coin control connector.

In the event that the coin is to be returned instead of collected, the coin refund key is operated instead of the coin collect key as just explained, resulting in all the above described operations except that relay CR in the coin control connector is operated and relay CC is not operated because the 110 volts (—) is of a polarity to cause current flow through rectifier AR for operating relay CR. This repeats 110 volts (—) from a make contact of relay CR and a break contact of relay CC to the line circuit over the previously described circuit, this time for refunding the coin. Since all other circuit operations are the same as previously described, it is not believed necessary to repeat this description in connection with the coin refund operation. It might be pointed out at this time that relay TR in the local outgoing trunk circuit is released for extinguishing the busy lamp when relay D of the connector releases to remove (+) from sleeve conductor SL.

*Outgoing call from local toll board*

Figures 2, 7, 8:
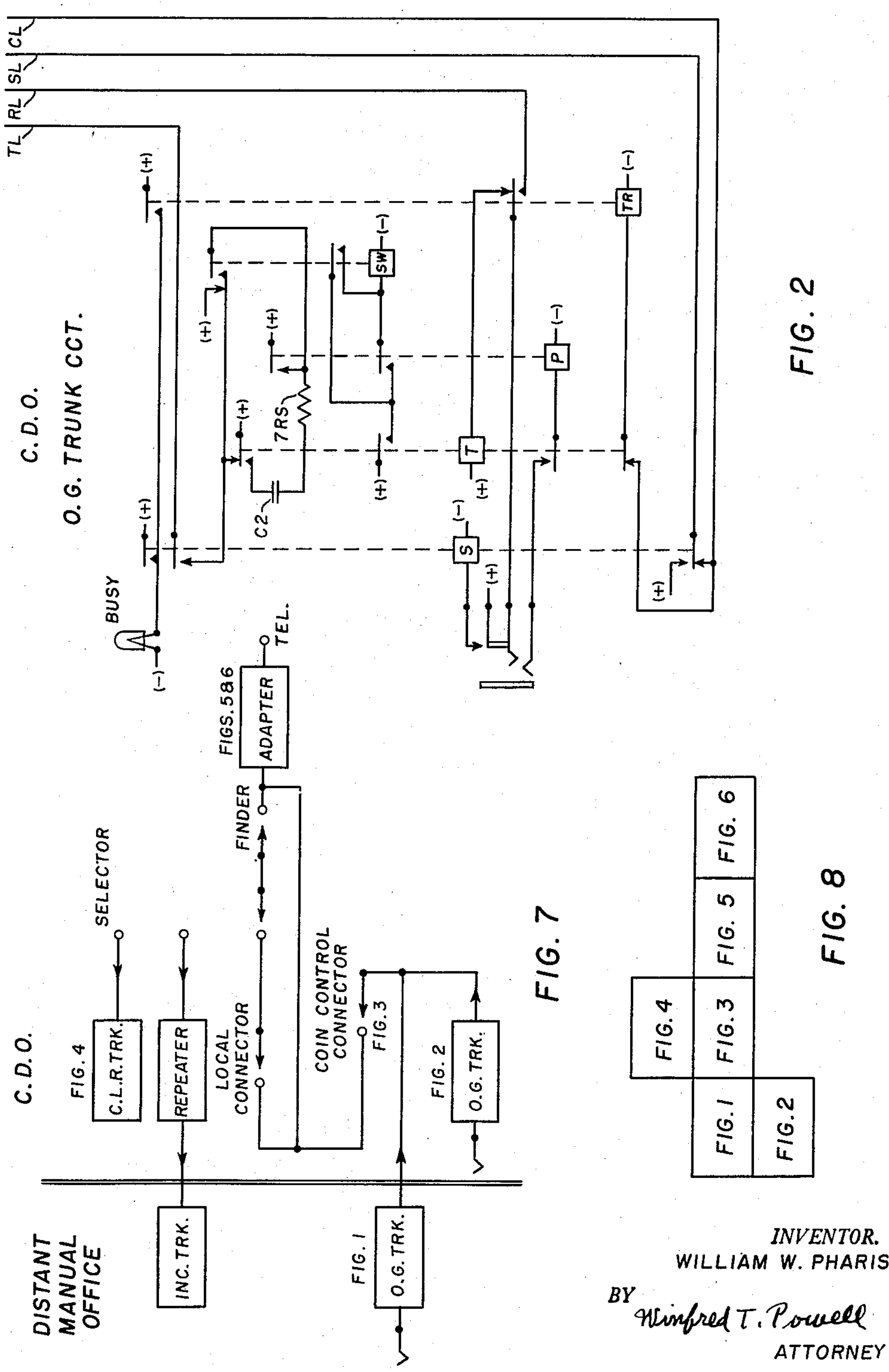
Fig. 2 illustrates an outgoing trunk circuit which may be associated with a manual position when the manual toll board is located in the same office as the automatic equipment.

Referring to Fig. 2, the local manual operator plugs into the outgoing trunk jack for operating the coin control connector in the same manner as described in connection with a call from the distant manual operator. The local contact of the jack closes an obvious circuit for operating relay S in the outgoing trunk circuit and this relay in turn closes an obvious circuit for lighting the busy lamp in the local office. Relay S disconnects conductor CL from conductor SL and applies (+) to this latter conductor for operating relay S in the coin control connector over a circuit extending from (+), make contact of relay S, conductor SL, break contact of relay D and winding of relay S to (—). Relay S closes a locking circuit for itself which is independent of the break contact of relay D.

The operation of relay S in the coin control connector disconnects the R trunk leading to the distant office from the CC and CR relays of the coin control connector and applies (—) to this trunk over a circuit extending from (—), resistor 1RS, make contact of relay S, trunk conductor R, break contact of relay BL in the distant office outgoing trunk circuit and winding of relay SY to (+). Relay SY operates and lights the busy lamp associated with this jack in the distant manual office over a circuit extending from (+), break contact of relay BL, make contact of relay SY and lamp to (—). Relay S in the coin control connector switches the control and the coin circuits of this connector from the distant office trunk to the tip and ring trunk conductors TL and RL leading to the outgoing trunk circuit in the local office. The tip trunk conductor TL is now energized over a circuit extending from (+), break contact of relay SW, make contact of relays S (Fig. 2), conductor TL, make contact of relay S (Fig. 3), resistor 2RS and winding of relay PL to (—). By using a cord circuit that pulses over the sleeve of the cord and jack, relay P is operated through the dial contact springs. The dial and cord circuit is arranged so that relay T is operated as long as the dial is off-normal, thus closing the operating circuit for relay SW. Relay SW locks through a make contact of relay T as long as the dial is off normal and when the dial returns, relay P is pulsed for applying pulses to conductor TL by way of make contacts of relays P, SW and S, the condenser C2 and resistor 1RS being across these pulse contacts of relay P for spark suppression.

The connector is advanced to the desired line in the previously described manner and coin control is applied by way of the tip of the cord and jack for controlling the coin control and coin refund relays in the connector as previously described, it being understood that relay TR is operated after impulsing is completed by the operation of relay DGA2 in the connector, all in the previously described manner. Since the circuit operations, when controlled from the local office into the coin control connector, are the same as described in connection with the call from the distant office, it is not believed necessary to repeat this description at this time. In this example, relays CC and CR of the coin control connector are selectively responsive to the coin control and coin return battery from the local cord circuit for repeating coin control and coin return battery out to the called line.

*Paystation line called*

Figure 5:
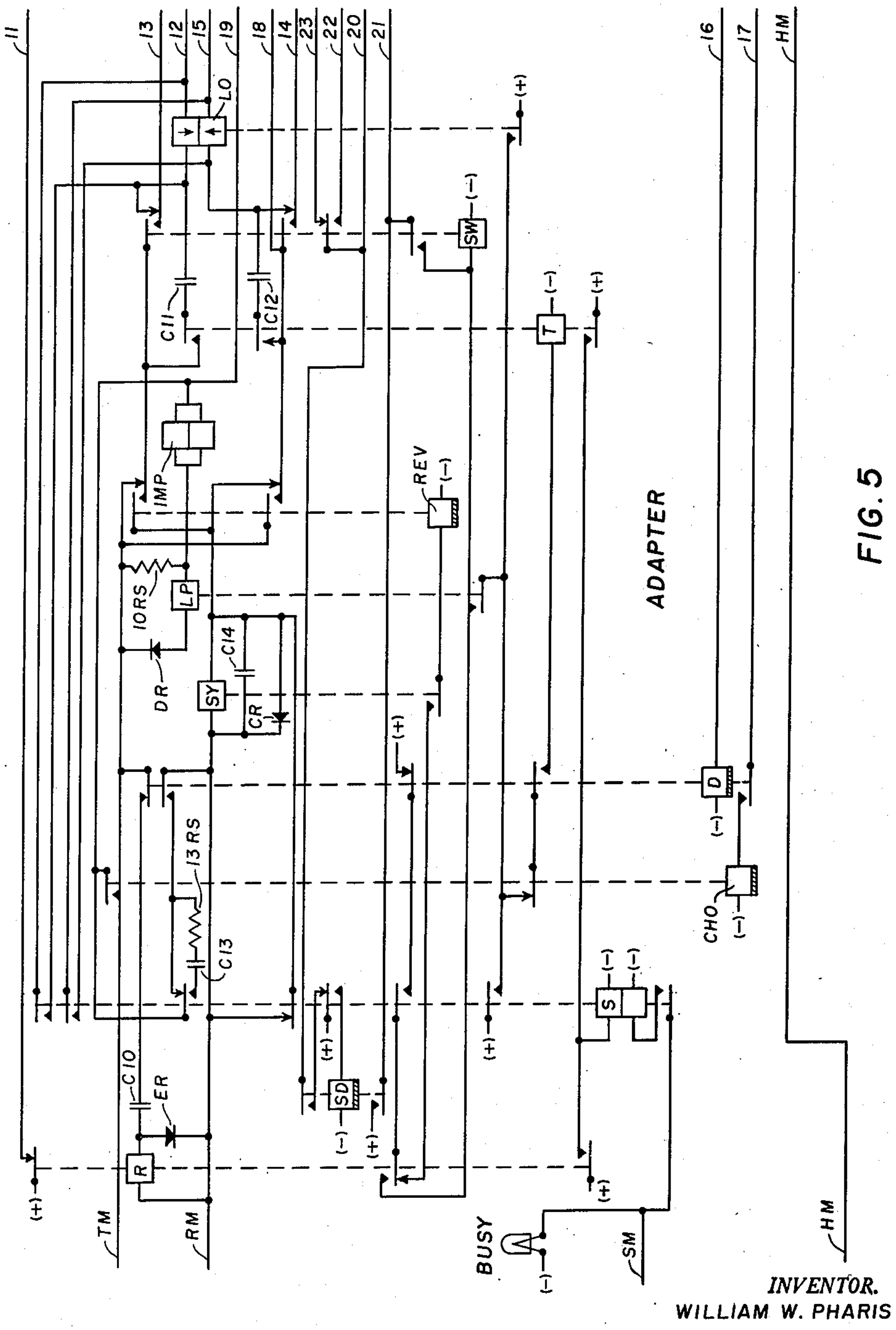

It will now be assumed that the paystation line connected to the adapter circuit in Figs. 5 and 6 is called by the toll operator by way of a regular or toll connector. This would be the case in connection with a delayed toll call, the connection being established through a regular or toll connector (not the coin connector of Fig. 3) so that the operator can ask for the deposit of one or more coins, the collection being automatically effected when the connection is released.

When a connector seizes the paystation line, (+) is applied by way of the sleeve wiper of the connector to conductor SM for lighting the busy lamp associated with the adapter. Now when ringing generator current is transmitted from the connector, this generator current flows from conductor TM through relay R by way of a break contact of relay D, condenser C10 and winding of relay R, shunted by rectifier ER to render the relay operative in response to alternating current. A circuit is now closed for operating relay S extending from (+), make contact of relay R and upper winding of relay S to (−). Relay S is locked operated as long as the connector is connected to the line, over a circuit extending from (+) on the sleeve conductor SM, make contact and lower winding of relay S to (−). Relay SD is now operated over a circuit extending from (+), make contact of relay S and winding of relay SD to (−). Relay SW is also operated at this time over a circuit extending from (+), break contact of relay D, make contact of relay S, make contact of relay R and winding of relay SW to (−). Relay SW closes a locking circuit for itself extending from (+), make contact of relay SD, make contact and winding of relay SW to (−). Relay SW cuts the tip and ring conductors TM and RM, from the connector banks, through conductors 13 and 14 to the tip and ring line conductors of the called line so that the bell may be rung. When the call is answered, the closed circuit across the called line trips the ring in the connector circuit, relay SY in the adapter not being operated because the direct current flow from the connector battery feed line is in the wrong direction for operating this relay. Even though relay SY is operated momentarily by the alternating ringing current, relay REV is not operated by way of the make contact of relay SY because its operating circuit is open at a break contact of relay R.

It will be noted that the operation of relay SW switches the line conductors through to the line terminals of the connector independent of the windings of relay LO. The operator now instructs the party at the paystation to drop the required coins and when conversation is completed and the connector is released, relay S of the adapter is released for in turn opening up and releasing relay SD. Relay TR1 is operated over a circuit extending from (+), break contact of relay S, make contact of relay SD, conductor 20 and winding of relay TR1 to (−). Relay TR1 closes a locking circuit for itself extending from (+), make contact of relay SD, conductor 21, make contact and winding of relay TR1 to (−). Relay TR1 closes an obvious circuit for operating relay TR2, this latter relay connecting resistor 12RS across the incoming end of the line circuit for supervision purposes.

Coin collect relay CC is operated over a circuit in multiple with relay TR1, extending through make contact of relay SW, conductor 22 and winding of relay CC to (−). Relay TR2 connects the line conductors of the called line together and relay TR1 prepares the circuit to these line conductors from the coin collect battery. With relay TR1 operated, intermittent pulses are applied to the winding of relay INT for intermittently operating this relay. Relay INT applies coin collect battery from the source of 110 volts (+), make contact of relay CC, winding of relay CN, make contact of relay INT, make contact of relay TR1 and over the above described circuit to the called line conductors. At each release of relay INT, relay CN is maintained operated over a circuit through resistor 11RS to (+). Consequently, the intermittent operation of relay INT holds relay CN operated for maintaining a locking circuit for relays TR1, SW and CC and intermittently applies the coin collect battery to the line. This circuit is maintained until the coins are collected, at which time the operation of relay INT sets up an open circuit condition for relay CN for effecting the release of this relay, which in turn effects the release of relays TR1, TR2, SW and CC.

Referring back to the operation of relay CN, a (+) potential is applied to the alarm conductor so that this alarm is brought into operation if relay CN remains energized longer than a predetermined interval of time.

What I claim is:

1. In a telephone exchange system, a local office, a line terminating in said local office and having a coin box thereon, an operator's position, two trunk conductors connecting said local office with said operator's position, cord circuits at said operator's position, a dial and coin control keys common to said cord circuits, coin control relays in said local office for controlling said coin box, means controlled by said dial over one of said trunk conductors for extending a connection from said operator's position to said line, and means controllable by said keys over another of said trunk conductors for controlling said relays.

2. In an automatic telephone system; a plurality of lines; a substation of the paystation type associated with one of said lines; automatic switching apparatus including non-numerical and numerical switches for establishing a talking circuit from said paystation to another of said lines, said talking circuit extending through at least one of said non-numerical switches; a coin control switch; an operator's circuit; means including said operator's circuit and said coin control switch for establishing a coin control connection to said paystation line at a point preceding said one non-numerical switch, said coin control connection being separate and distinct from said talking circuit; and means in said coin control switch for applying a signal to said operator's circuit to indicate the establishment of said coin control connection to said paystation line.

3. In an automatic telephone system; a plurality of lines; a substation of the paystation type associated with one of said lines; automatic switching apparatus including non-numerical and numerical switches for establishing a talking circuit from said paystation to another of said lines, said talking circuit extending through at least one of said non-numerical switches; a coin control switch; means for establishing a coin control connection to said paystation line at a point preceding said one non-numerical switch, said coin control connection being separate and distinct from said talking circuit; and other means separate and distinct from said talking circuit for controlling an indicating circuit, said indicating circuit indicating the proper operation of the coin apparatus at said substation.

4. In a telephone system, a paystation line having coin control equipment thereon, a paystation adapter associated with said line and connected to a line circuit, means in said adapter for receiving digital impulses from a dial on said line and for repeating a replica of said impulses by way of said line circuit for establishing outgoing talking connections from said paystation line to another line, a directively controlled automatic switch for establishing a non-talking connection to said paystation line, a control wiper associated with said switch, and means including said control wiper for disconnecting said paystation line from said talking connection and for applying coin control current to said paystation line.

5. In a telephone system, a paystation line having coin control equipment thereon, a paystation adapter associated with said line and connected to a line circuit, means in said adapter for receiving digital impulses from a dial on said line and for repeating a replica of said impulses by way of said line circuit for establishing outgoing talking connections from said paystation line to another line, a directively controlled automatic switch for establishing a non-talking connection to said paystation line, a control wiper associated with said switch, means including said control wiper for disconnecting said paystation line from said talking connection and for applying coin control current to said paystation line, and additional means including said talking connection for controlling the application of coin control current to said paystation line.

6. In a telephone system, a paystation line having coin control equipment thereon, a line circuit, a paystation adapter connected between said line and said line circuit, means including said adapter for establishing outgoing talking connections from said paystation line to another line, a directively controlled automatic switch for establishing a non-talking connection to said paystation line, a control wiper associated with said switch, means including said control wiper for disconnecting said paystation line from said talking connection and for intermittently applying coin control current to said paystation line, additional means including said talking connection for controlling the intermittent application of coin control current to said paystation line, and means including said automatic switch and said talking connection for indicating that coin control current is being applied to said paystation line.

7. In a telephone system, a paystation line having coin control equipment thereon, a line circuit, a paystation adapter connected between said line and said line circuit, means including said adapter for establishing outgoing talking connections from said paystation line to another line, a directively controlled automatic switch for establishing a non-talking connection to said paystation line, a control wiper associated with said switch, means including said control wiper for disconnecting said paystation line from said talking connection and for intermittently applying coin control current to said paystation line, additional means including said talking connection for controlling the intermittent application of coin control current to said paystation line, means including said automatic switch and said talking connection for indicating that coin control current is being applied to said paystation line, and additional means for indicating that said coin control equipment has completed its collecting or refunding operation.

8. In a telephone system, a paystation line, a paystation on said line, an adapter circuit terminating said line and including coin control means for selectively impressing coin collect and coin refund potentials upon at least one conductor of said line, an operator's position, means including said adapter circuit for setting up a connection between said line and said operator's position, an automatic switch separate from said connection, means controllable from said operator's position in response to the dialing of a specific number for advancing said automatic switch to a specific terminal associated with said paystation line, and means controllable from said operator's position over said automatic switch and said specific terminal for selectively controlling said coin control means for collecting or refunding coins at said paystation.

9. In a telephone system, a local office and a distant office, a paystation line in said local office, a paystation on said line, an adapter circuit terminating said line and including coin control means for selectively impressing coin collect and coin refund potentials upon at least one of the conductors of said line, an operator's position in each of said exchanges, means including said adapter circuit for setting up a connection between said line and either one of said operator's positions, an automatic switch separate from said connection, means controllable from either of said operator's positions in response to the dialing of a specific number for advancing said automatic switch to a specific terminal associated with said paystation line, means controllable from either of said operator's positions over said automatic switch and said specific terminal for selectively controlling said coin control means for collecting or refunding coins at said paystation, and busy indicating means at each operator's position for indicating the use of said automatic switch by the other operator's position.

10. In a telephone system, a paystation line having coin control equipment thereon, a paystation adapter permanently and operatively associated with said line and connected to a line circuit, means in said adapter for receiving digital impulses from a dial on said line and for repeating a replica of said impulses by way of said line circuit for establishing an outgoing talking connection from said paystation line to another line, a directively controlled automatic switch for establishing a non-talking connection to said paystation line, a control wiper associated with said switch, means including said control wiper for disconnecting said paystation line from said line circuit and for applying coin control current to said paystation line, and means for energizing an alarm circuit during the time coin control current is applied to said paystation line.

11. In a telephone system; a paystation line having coin control equipment thereon; a paystation adapter permanently and operatively associated with said line and connnected to a line circuit; means in said adapter for receiving digital impulses from a dial on said line and for repeating a replica of said impulses by way of said line circuit for establishing an outgoing talking connection from said paystation line to another line; a directively controlled automatic switch for establishing a non-talking connection to said paystation line; a control wiper associated with said switch; and means including said control wiper for disconnecting said paystation line from said line circuit, for applying coin control current to said paystation line and for connecting a closed holding circuit across said line circuit.

12. In an automatic telephone system; a plurality of lines; a substation of the paystation type operatively connected to one of said lines; automatic switching apparatus including non-numerical and numerical switches for establishing a talking circuit from said paystation to another of said lines, said talking circuit extending through at least one of said non-numerical switches; a coin control switch; means including a control wiper of said coin control switch for establishing a coin control connection to said paystation line at a point preceding said one non-numerical switch; means controlled over said control wiper for disconnecting said paystation line conductors from said automatic switching apparatus and for connecting these line conductors to said control wiper; means for applying coin control current to said paystation line conductors by way of said control wiper; and other means separate and distinct from said talking circuit for controlling an indicating circuit, said indicating circuit indicating the proper operation of the coin apparatus at said substation.

13. In an automatic telephone system; a plurality of lines; a substation of the paystation type operatively connected to one of said lines; automatic switching apparatus including non-numerical and numerical switches for establishing a talking circuit from said paystation to another of said lines, said talking circuit extending through at least one of said non-numerical switches; a coin control switch; means for establishing a coin control connection to said paystation line at a point preceding said one non-numerical switch, said coin control connection being separate and distinct from said talking circuit; and other means separate and distinct from said talking circuit for controlling an indicating circuit; and means for causing said indicating circuit to visually and audibly indicate the proper operation of the coin control apparatus at said paystation.

WILLIAM W. PHARIS.

References Cited in the file of this patent

UNITED STATES PATENTS

| Number | Name | Date |
|---|---|---|
| 2,288,789 | Crocker | July 7, 1942 |
| 2,374,964 | Walsh | May 1, 1945 |
| 2,385,720 | Molnar | Sept. 25, 1945 |
| 2,471,087 | Anderson | May 24, 1949 |
| 2,483,206 | Jones | Sept. 27, 1949 |
| 2,520,644 | Lomax | Aug. 29, 1950 |
| 2,558,571 | Lamberty | June 26, 1951 |